Patented Aug. 9, 1927.

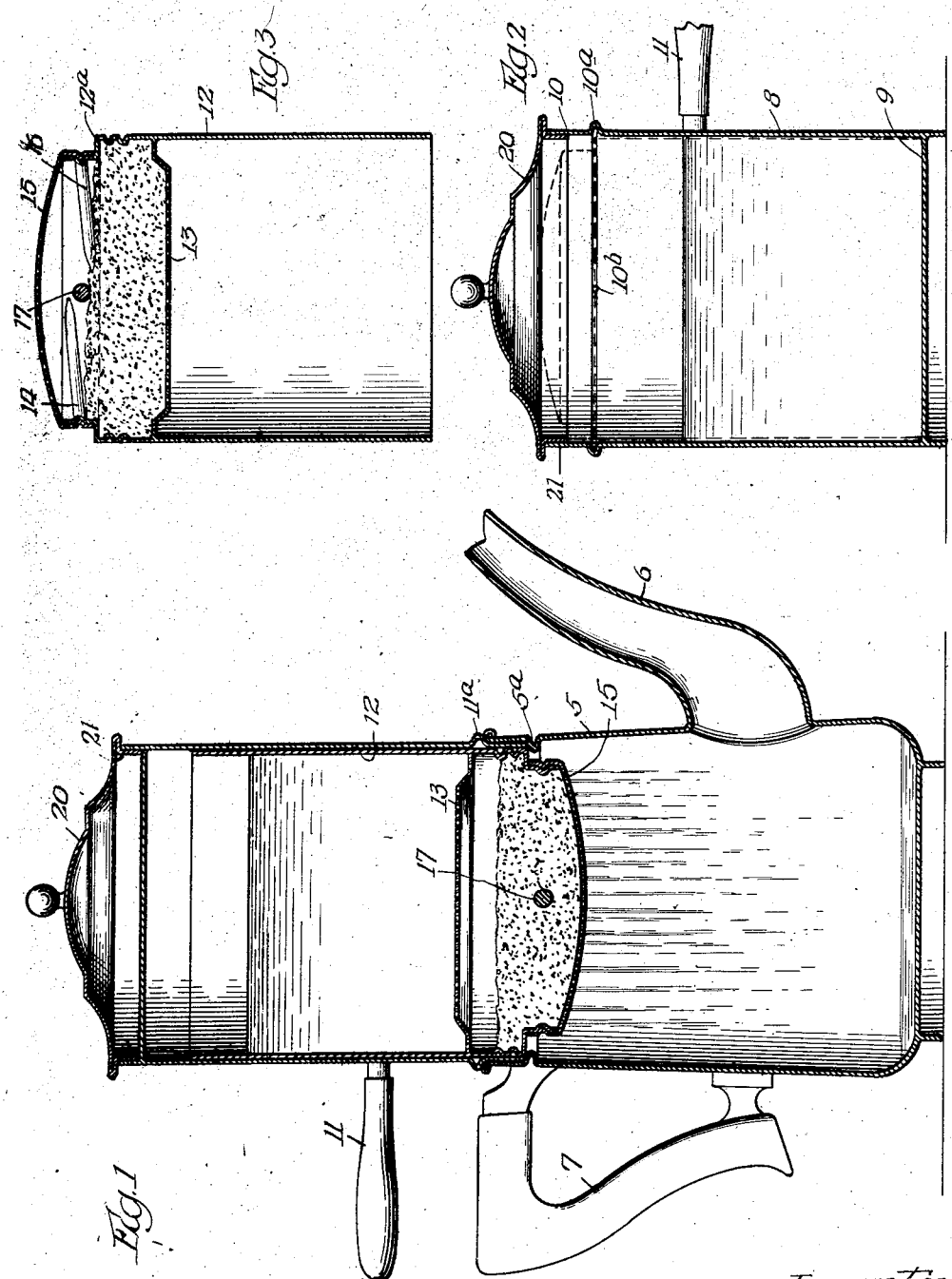

1,638,013

UNITED STATES PATENT OFFICE.

THOMAS MAGLIANO, OF RIVER FOREST, ILLINOIS.

COFFEE MAKER.

Application filed January 25, 1926. Serial No. 83,429.

The invention relates to coffee makers, and its object is to provide an improved apparatus for making drip coffee which comprises a container in which the water may be brought approximately to the boiling point separately from the coffee and then quickly manipulated into connection with the ground coffee container and with the coffee-pot, so that the water will pass through the ground coffee and drip into the pot.

The invention consists in the several novel features hereinafter set forth and more particularly defined by claims at the conclusion hereof.

In the drawings: Fig. 1 is a vertical section of apparatus embodying the invention, the parts being shown in operative position. Fig. 2 is a detail section of the water heater. Fig. 3 is a detail section of the holder for ground coffee.

The invention is exemplified with a coffee-pot comprising a body 5 provided with the usual discharge spout 6 and handle 7. A cylindrical water-heater, adapted to be set on a stove so the water may be heated approximately to the boiling point, comprises an annular vertical wall 8, a closed bottom 9, above the lower rim of wall 8. The upper end 10 of wall 9 is adapted, when inverted, to telescope into the upper end of the body 5 of the pot. The heater is provided with a handle 11 at one side, by which it can be manipulated and inverted. An annular shoulder 10$^a$ is formed below the upper end of the heater to engage the upper rim of the body 5 of the coffee-pot, to sustain the heater, when inverted, in elevated position, so that its contents will pass into the pot. A ground coffee container, comprises a vertically extending cylindrical wall 12 adapted to telescope into the water-heater, a fixed transverse perforated wall 13 for holding ground coffee in the upper end of the container, a reduced upper rim 14 above wall 13, and a perforated cover 15 adapted to be suitably secured, as by a short screw-thread 16, to the rim 14, to form a chamber 12$^a$ above the perforated wall 13, in which the ground coffee will be confined. This chamber is approximately of the size necessary to hold the proper quantity of coffee for the capacity of the pot. The screw-thread 16 is adapted to lock the cover on the body of the container after the coffee has been placed therein. A cross-rod 17 is secured in rim 14 to serve as a handle for manipulating the container when the cover 15 is removed.

The operation of the improved apparatus is as follows: The water-heater, containing the proper amount of water, is set on a stove to heat it approximately to the boiling point. The cover 15 is removed from the coffee container, and the proper amount of coffee is placed into chamber 12$^a$ above the perforated wall 13. The cover 15 is then replaced and locked on the container. When the water has been heated, the container is telescoped into the water heater, the cylindrical wall 12, extending to the bottom of the water-heater. The coffee-chamber in the container will be disposed above the water in the heater. Next, the heater with the container therein, will be inverted, and the rim portion 10 of the heater telescoped into the upper end of the pot 5, and shoulder 10$^a$ will support the heater and prevent it from dropping into the coffee-pot. The container will be arrested by an annular shoulder 5$^a$ in the pot, so it will be suspended above the highest point reached by the infusion in the pot. A leak-port 10$^b$, formed in shoulder 10$^a$, will admit air slowly into the heater, so it will pass upwardly around wall 8 of the heater to the top of the water held within the wall 12 of the container, and permit the water to pass slowly through the coffee in chamber 12$^a$. The water in the heater will pass through the perforated wall 13, seep through the coffee in the container and drip through the perforated cover 15 into the coffee pot, from which it will be served. After all of the water has dripped into the coffee pot, the heater and ground coffee container may be removed.

A cover 20 is provided with a flange 21 to fit into and close the top of the heater, as shown in Fig. 2. This flange is also adapted to fit into the lower rim of the heater, so the cover may be held while the heater is inverted and while the coffee is being made, as shown in Fig. 1. The same cover may also be used to close the top of the coffee pot, when the heater and container have been removed and the coffee infusion is being served.

The invention is not to be understood as restricted to the details set forth, since these may be modified within the scope of the appended claims, without departing from the spirit and scope of the invention.

Having thus described the invention, what

I claim as new and desire to secure by Letters Patent, is:

1. The combination with a coffee pot, of a vessel for hot water having a cylindrical wall, a closed bottom, and an open top, the upper end of the wall being adapted, when the vessel is inverted, to telscope and connect with the upper end of the pot to discharge into it, and having an annular outwardly bulged shoulder indented therein, and a perforated container for ground coffee fitting into the vessel and invertible therewith and provided with a cylindrical wall extending downwardly into the vessel, said shoulder being provided with a leak-port extending therethrough, the port being adapted to admit air into the vessel and around said last mentioned cylindrical wall when the vessel and container are in their inverted position.

2. The combination with a coffee pot, of a vessel for heating water, having a cylindrical side wall, a closed bottom spaced from the lower end of the wall, and an open top, the upper end of the wall being adapted, when the vessel is inverted, to telescope and connect with the upper end of the pot to discharge into it, a perforated container for ground coffee fitting into the vessel and invertible therewith so that the water will pass into the container and drop into the pot, and a cover provided with an annular flange for fitting into the upper end of the wall when the vessel is in its normal position and for fitting into the lower end of the wall when the vessel is in its inverted position.

Signed at Chicago, Illinois, this 18th day of January, 1926.

THOMAS MAGLIANO.